US008589710B2

(12) United States Patent
Hitaka et al.

(10) Patent No.: US 8,589,710 B2
(45) Date of Patent: Nov. 19, 2013

(54) IMAGE FORMING DEVICE WHICH PERFORMS POWER SAVING CONTROL UPON AUTHENTICATION PRINTING

(75) Inventors: Masatoshi Hitaka, Sagamihara (JP); Takuya Imai, Mitaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 350 days.

(21) Appl. No.: 13/038,069

(22) Filed: Mar. 1, 2011

(65) Prior Publication Data
US 2011/0219250 A1 Sep. 8, 2011

(30) Foreign Application Priority Data
Mar. 4, 2010 (JP) ................................. 2010-047873

(51) Int. Cl.
*G06F 1/00* (2006.01)
*G06F 1/26* (2006.01)
*G06F 21/00* (2013.01)
*B41J 29/38* (2006.01)
*G06K 15/00* (2006.01)

(52) U.S. Cl.
USPC ........... 713/323; 713/320; 713/324; 713/182; 347/5; 358/1.14

(58) Field of Classification Search
USPC ................ 713/320, 32, 324, 182, 323; 347/5; 358/1.14
See application file for complete search history.

(56) References Cited

U.S. PATENT DOCUMENTS

| 8,046,613 | B2 * | 10/2011 | Enami et al. | 713/320 |
| 8,322,609 | B2 * | 12/2012 | Hashimoto | 235/382 |
| 2008/0180737 | A1 * | 7/2008 | Sakamoto | 358/1.15 |
| 2010/0188686 | A1 * | 7/2010 | Konno | 358/1.14 |

FOREIGN PATENT DOCUMENTS

| JP | 2004-152140 | 5/2004 |
| JP | 2007-296771 | 11/2007 |
| JP | 2009-145738 | 7/2009 |
| JP | 2009-200615 | 9/2009 |

OTHER PUBLICATIONS

Notice of Grounds of Rejection mailed Feb. 28, 2012, directed to Japanese Application No. 2010-047873; 6 pages.

\* cited by examiner

*Primary Examiner* — Stefan Stoynov
(74) *Attorney, Agent, or Firm* — Morrison & Foerster LLP

(57) ABSTRACT

An image forming device can operate in a print mode, a first power saving mode, and a second power saving mode. In the print mode, a first circuit having a unit to acquire the state of the image forming device and a second circuit are both activated. In the first power saving mode, neither the first circuit nor the second circuit is activated. In the second power saving mode, only the first circuit is activated. When a secure print instruction is received in the first power saving mode, the operation mode is switched to the second power saving mode. When the identity of the user is authenticated in the second power saving mode, the operation mode is switched to the print mode. Accordingly, it is possible to provide the image forming device which can restrict power consumption and also reduce the time required for printing out after the identity authentication.

11 Claims, 11 Drawing Sheets

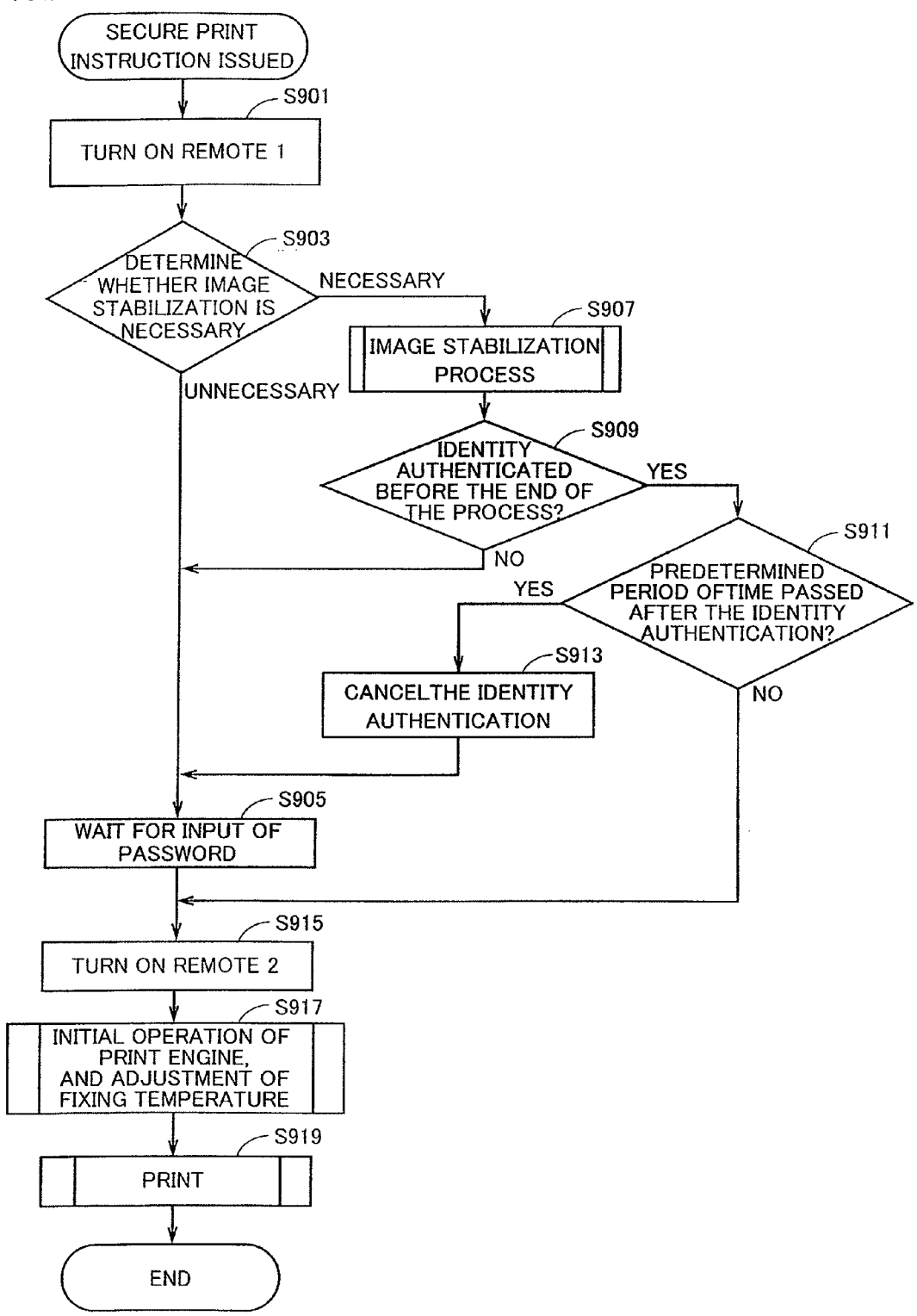

IMAGE FORMING DEVICE WHICH PERFORMS POWER SAVING CONTROL UPON AUTHENTICATION PRINTING

This application is based on Japanese Patent Application No. 2010-047873 filed with the Japan Patent Office on Mar. 4, 2010, the entire content of which is hereby incorporated by reference.

BACKGROUND OF THE INVENTION

1. Field of the Invention

The present invention relates to image forming devices, and more particularly, to an image forming device which has a power saving mode, as an operation mode, in which power consumption is saved.

2. Description of the Related Art

There is known an image forming device (such as a multi-function peripheral (MFP) provided with the scanner function, facsimile function, copying function, function as a printer, data communication function, and server function, a facsimile machine, a copier, a printer, and the like) which has the function of saving electric power by setting the operation mode to a power saving mode in which power supply to an image forming unit and the like is stopped.

There is also known an image forming device which has the authentication printing function (also referred to as "secure print") which enables image formation only when authentication of a user (also referred to as "identity authentication") has succeeded.

Document 1 below discloses an image forming device which controls driving of an operation panel in the power saving mode so as to restrict power consumption. In this image forming device, when a secure print instruction is accepted while the device is operating in the power saving mode, control of the operation panel is started. When the user performs an authentication operation via the operation panel, the power saving mode is released, and warming up is started. When the warming up is completed, printing is carried out. On the other hand, when a print instruction other than the secure print instruction is accepted while the device is operating in the power saving mode, the image forming device performs printing, without performing the control of the operation panel. Power consumption is thus restricted.

[Document 1] Japanese Patent Application Laid-Open No. 2004-152140

Warming up from the power saving mode may take some time, from several to several tens of seconds. For example, it is now assumed that in an electrophotographic image forming device, a non-contact thermistor is used to detect a temperature of a fixing device for control of the fixing device. In this case, detection of the temperature of the fixing device is not performed during the power saving mode, so as to save power. In order for the image forming device to enter a printable state from the power saving mode, it is necessary, firstly, to determine the temperature of the fixing device detected by the thermistor and, thereafter, to start driving the fixing device while referring to the detected temperature. A few seconds are required for the non-contact thermistor to determine the detected temperature of the fixing device.

With the image forming device as described in Document 1 above, in the case where a secure print instruction is received while the device is operating in the power saving mode, identity authentication is performed first, and then the power saving mode is released before the warming up is started. Thus, when the warming up requires a long time as described above, it will take a considerable time from when the identity authentication is performed until the warming up is finished. Such a long time required from the identity authentication till the printing out degrades convenience of the image forming device.

As a way of solving the above-described problem, it may be conceivable to cause the image forming device to release the power saving mode in the case where a secure print instruction is received while operating in the power saving mode. In this case, the warming up may be started earlier, resulting in a reduction in time required until the printing out. However, after the warming up is finished, the warmed state needs to be maintained until the end of the identity authentication process. This means that the power will be wasted if it takes some time before the identity authentication is completed.

SUMMARY OF THE INVENTION

The present invention has been accomplished in view of the foregoing, and an object of the present invention is to provide an image forming device which is capable of restricting power consumption and also capable of reducing the time required for printing out after the identity authentication.

To achieve the above object, according to an aspect of the present invention, there is provided an image forming device including: a first circuit; a second circuit which is at least partially different from the first circuit; a first power supply control unit configured to perform power supply control of the first circuit; and a second power supply control unit configured to perform power supply control of the second circuit; the first circuit having an acquiring unit configured to acquire a state of the image forming device, the image forming device being capable of operating in a print mode in which the first and second circuits are activated in accordance with the power supply control by the first and second power supply control units, a first power saving mode in which the first power supply control unit performs no power supply control so that the first circuit is not activated and in which the second power supply control unit performs no power supply control so that the second circuit is not activated, and a second power saving mode in which, while the second power supply control unit performs no power supply control so that the second circuit is not activated, the first power supply control unit performs the power supply control so that the first circuit is activated to perform the acquisition by the acquiring unit, the image forming device further including: a first switching unit configured to switch an operation mode from the first power saving mode to the second power saving mode in the case where an instruction to perform secure print is received while the device is operating in the first power saving mode; and a second switching unit configured to switch the operation mode from the second power saving mode to the print mode in the case where the identity of a user is authenticated while the device is operating in the second power saving mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a flowchart illustrating an operation of the image forming device in the case where identity authentication is performed during an image stabilization process.

DESCRIPTION OF THE PREFERRED EMBODIMENTS

Embodiments of the image forming device according to the present invention will now be described.

The image forming device is a multi-function peripheral (MFP) provided with the scanner function, copying function, function as a printer, facsimile transmitting/receiving function, data communicating function, and server function. With the scanner function, the image forming device reads an image from a document which has been set, and stores the read image in a hard disk drive (HDD) or the like. With the copying function, the device further prints the image on a sheet of paper or the like. With the function as a printer, on receipt of a print instruction from an external terminal such as a personal computer (PC), the device prints an image on a sheet of paper on the basis of the instruction. With the facsimile transmitting/receiving function, the device receives facsimile data from an external facsimile machine or the like and stores the data in a HDD or the like. With the data communicating function, the device transmits data to or receives data from an external device connected thereto. With the server function, the device allows a plurality of users to share, e.g., data stored in a HDD or the like.

First Embodiment

Figure 1:
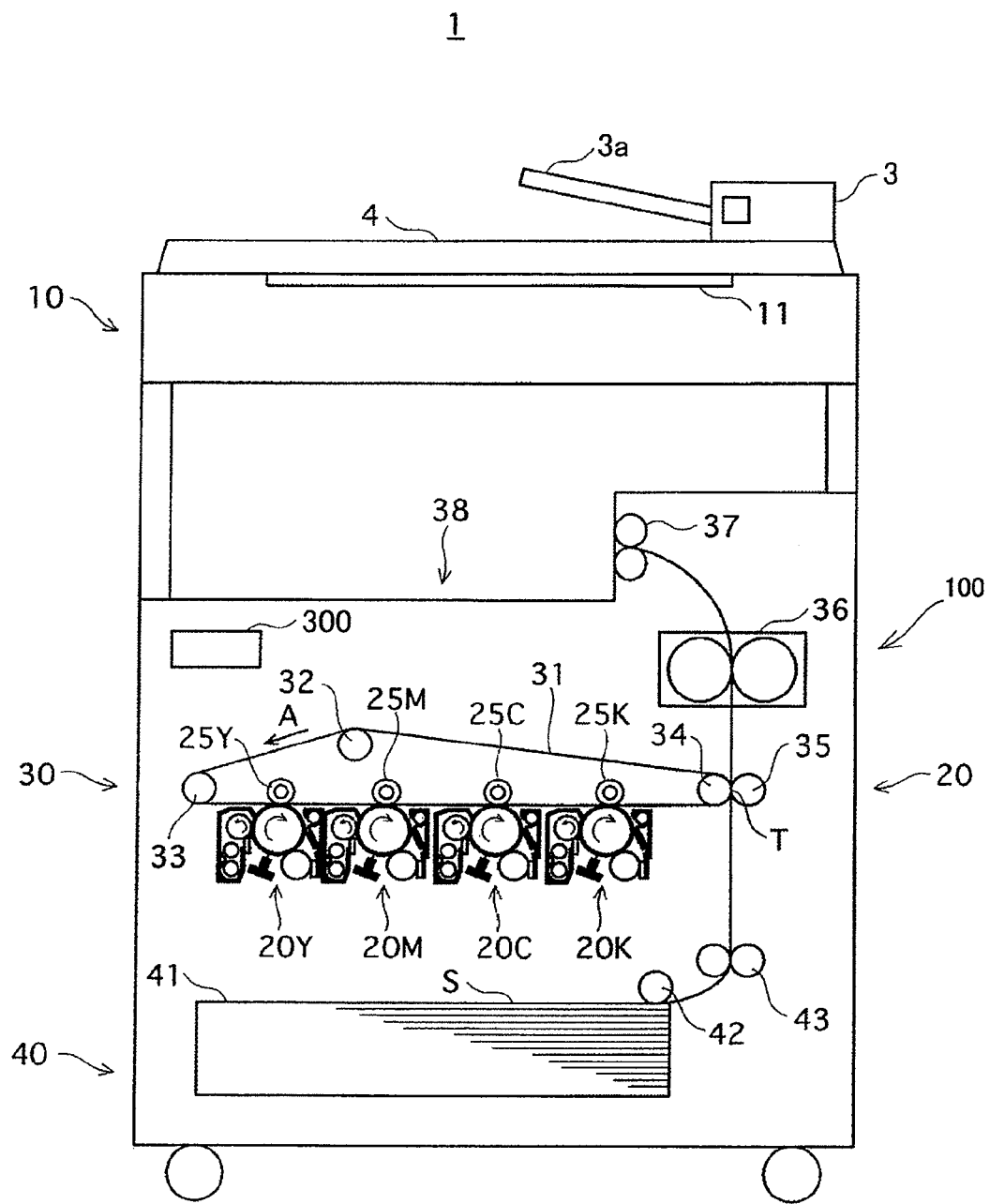
FIG. 1 is a front view of an image forming device according to a first embodiment of the present invention.

FIG. 1 is a front view of an image forming device according to a first embodiment of the present invention.

Referring to FIG. 1, an image forming device 1 primarily includes a scanner unit 10, a transfer unit 20, a development unit 30, a paper feed unit 40, and a CPU (as an example of an image formation control unit) 300. Transfer unit 20, development unit 30, and CPU 300 constitute an image forming unit 100.

Scanner unit 10 includes a platen glass 11, an auto document feeder (ADF) 3, a document feed tray 3a, and a document catch tray 4. A document whose image is to be read is placed on platen glass 11. ADF 3 feeds a sheet of document paper onto platen glass 11. The document to be read using ADF 3 is placed on document feed tray 3a. The document that has been read using ADF 3 is stacked on document catch tray 4.

Transfer unit 20 includes a secondary transfer roller 35, a fixing device 36, a discharge roller 37, and a paper discharge unit 38. Secondary transfer roller 35 transfers a tonner image on an intermediate transfer belt 31 to a sheet of paper at a nip portion T. Fixing device 36 heats the sheet on which the toner image has been transferred, to cause the toner to be fixed on the sheet.

Development unit 30 includes development devices 20Y, 20M, 20C, and 20K, intermediate transfer belt 31, rollers 32, 33, and 34, and transfer rollers 25Y, 25M, 25C, and 25K. Development devices 20Y, 20M, 20C, and 20K correspond to yellow (Y), magenta (M), cyan (C), and black (K), respectively, so that image forming device 1 is capable of printing a color image on a sheet of paper. Rollers 32, 33, and 34 drive intermediate transfer belt 31 in an arrow A direction in FIG. 1. Transfer rollers 25Y, 25M, 25C, and 25K transfer the tonner images formed on photoreceptors of the corresponding development devices 20Y, 20M, 20C, and 20K, onto intermediate transfer belt 31. As a result, the toner images of the four colors are superposed on one another on intermediate transfer belt 31.

In the present embodiment, development devices 20Y, 20M, 20C, and 20K are each provided in the form of a cartridge, except for an exposure device, so that any of development devices 20Y, 20M, 20C, and 20K can be readily replaced in the event that the toner contained therein has run out or the photoreceptor therein is damaged. That is, development devices 20Y, 20M, 20C, and 20K are replaceable consumables.

Paper feed unit 40 includes a paper feed tray 41, a feed roller 42, and a paper transport roller 43. Paper feed tray 41 stores a plurality of sheets S for use in forming images thereon. Feed roller 42 and paper transport roller 43 feed one sheet S at a time to transfer unit 20.

Figure 2:
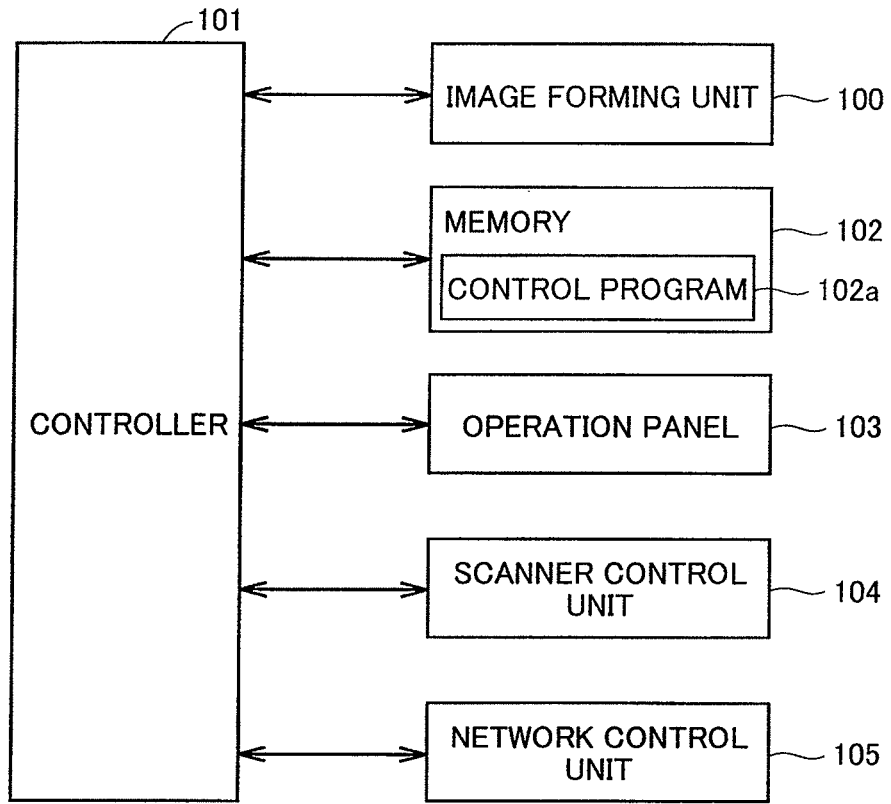
FIG. 2 is a block diagram showing a configuration of a control circuit in the image forming device.

FIG. 2 is a block diagram showing a configuration of a control circuit included in image forming device 1.

Referring to FIG. 2, image forming device 1 operates, with its components controlled under the control of a controller 101. Image forming device 1 has a plurality of operation modes, as will be described later, and operates in a manner corresponding to each operation mode. Controller 101 controls image forming unit 100, a memory 102, an operation panel 103, a scanner control unit 104, and a network control unit 105. Operation panel 103 has a touch panel that is capable of accepting a user operation, for example. Scanner control unit 104 controls scanner unit 10. Network control unit 105 has a function of connecting image forming device 1 to a local area network (LAN), for example. This enables image forming device 1 to communicate with another device (such as a personal computer) connected to the LAN.

Memory 102 may be a RAM or a ROM, for example. Memory 102 stores, for example, a control program 102a of image forming device 1. Memory 102 also stores image data that has been read by scanner unit 10, or image data to be printed. Controller 101 reads control program 102a from memory 102 and executes the program to thereby control the various operations of image forming device 1.

An example of the operation of image forming device 1 will now be described. For example, in the case where a user operates operation panel 103 to issue a copy instruction, controller 101 detects that the copy instruction has been issued. Controller 101 outputs an instruction to scanner control unit 104 so as to cause scanner unit 10 to capture an image in the form of image data. Controller 101 has a CMYK conversion unit, which converts the captured image data from RGB format to CMYK format. The resultant image data is temporarily stored in memory 102. Controller 101 transfers the image data temporarily stored in memory 102, to CPU 300 included in image forming unit 100. CPU 300 causes an image pattern of the transferred image data to be exposed and developed in development devices 20Y, 20M, 20C, and 20K, so that the image is printed on a sheet of paper.

Image forming device 1 may perform printing by receiving a print job from a personal computer communicably connected thereto via the network. In this case, when network control unit 105 receives the print job from the personal computer, the image data of that job, in the CMYK format, is temporarily stored in memory 102. Thereafter, the image is printed on a sheet of paper, similarly as described above.

In the present embodiment, image forming device 1 has an authentication function of authenticating the identity of a user. The identity authentication refers to a process of identifying a user who is operating image forming device 1 as the user who is entitled to operate the device. The identity authentication may be performed for example in the following manner. Image forming device 1 has a user authentication database stored in advance in memory 102. In executing the authentication function, controller 101 prompts the user, who wishes to be authenticated, to input a prescribed password via operation panel 103. Controller 101 refers to the user authentication database to determine whether the input password corresponds to the user who wishes to be authenticated. If the password corresponds to the user, controller 101 determines that the identity authentication of the user is successful, in which case controller 101 allows the authenticated user to execute a prescribed operation. The authentication function does not necessarily have to be based on an input of a password. Authentication information stored in an authentication card possessed by the user, or biometric information of the user, such as the fingerprint, may be read for the identity authentication.

Image forming device 1 is capable of executing various operations using the authentication function, including "secure print" in which a printing operation is performed following the identity authentication, and "secure scan" in which an image is read following the identity authentication. In the secure print, after a print instruction is accepted, printing based on that print instruction is not performed until the identity authentication of the user is performed, and once the identity of the user is authenticated, the printing based on the print instruction is executed. Whether to execute an operation using the authentication function or not is designated by a user when the user issues a print instruction or the like. For example, a user is able to issue a secure print instruction as the print instruction, so as to instruct the device to perform printing in accordance with the secure print. Using the authentication function can prevent another user from seeing the printed matter. Alternatively, the authentication function may be used for all users, irrespective of whether the function is designated by each user or not. Still alternatively, the authentication function may be used automatically for a user having a particular attribute, or for data to be printed which has a particular attribute.

Figure 3:
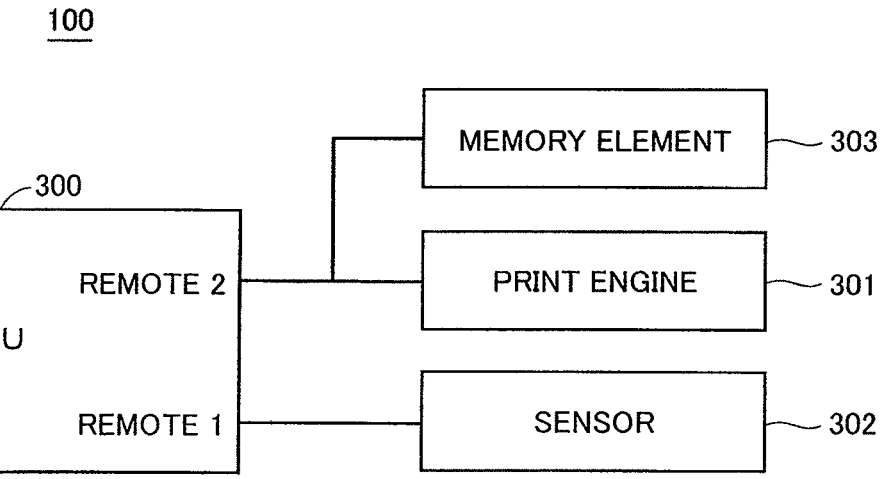
FIG. 3 is a block diagram showing a configuration of an image forming unit.

FIG. 3 is a block diagram showing a configuration of image forming unit 100.

Referring to FIG. 3, image forming unit 100 includes CPU 300, a print engine 301, a sensor (an example of an acquiring unit) 302, and a memory element 303. CPU 300, which is under the control of controller 101 for example, controls operations of the respective components in image forming unit 100. Print engine 301 performs a printing operation onto a sheet of paper. Print engine 301 is made up of transfer unit 20, development unit 30, paper feed unit 40, and other components.

In the present embodiment, sensor 302 is a non-contact thermistor which detects a temperature of a fixing roller in fixing device 36. CPU 300 controls fixing device 36 on the basis of the temperature of the fixing roller detected by sensor 302. This ensures that the toner fixing temperature is maintained at an appropriate level during printing.

Memory element 303 is for example an electrically erasable and programmable read only memory (EEPROM). Memory element 303 is provided for each of development devices 20Y, 20M, 20C, and 20K. CPU 300 writes to memory element 303 or reads from memory element 303 consumables information regarding the corresponding one of development devices 20Y, 20M, 20C and 20K. The consumables information may include, for example, the total number of printed pages or the toner consumption information for each of development devices 20Y, 20M, 20C, and 20K.

In the present embodiment, CPU 300 is provided with a terminal for a power supply control system called "remote 1", and a terminal for another power supply control system called "remote 2". Remote 1 is connected with a circuit (an example of a first circuit) including sensor 302. Remote 2 is connected with a circuit (an example of a second circuit) including print engine 301 and memory element 303. When remote 1 is turned on by power supply control by CPU 300, as will be described later, sensor 302 is powered on and activated. When remote 2 is turned on by power supply control by CPU 300, print engine 301 and memory element 303 are powered on and activated.

An operation of image forming device 1 at the time of printing will now be described. Image forming device 1 operates in a print mode during printing. The print mode is one of the operation modes. In the print mode, CPU 300 turns on both remote 1 and remote 2.

Figure 4:
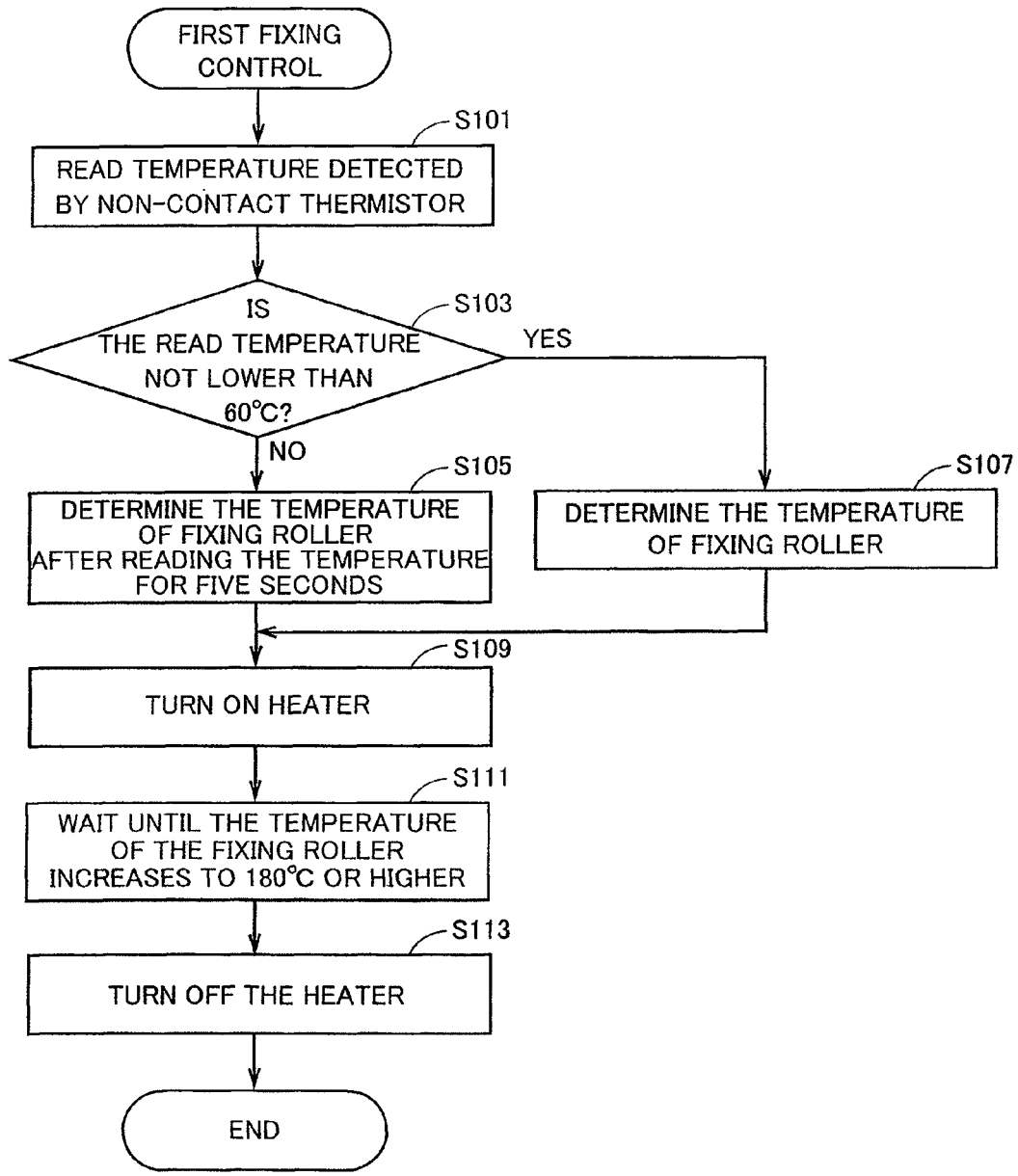
FIG. 4 is a flowchart illustrating an operation of controlling a fixing device at the time of printing in the image forming device.

FIG. 4 is a flowchart illustrating an operation of controlling fixing device 36 at the time of printing in image forming device 1.

In the print mode, CPU 300 controls the operation of fixing device 36 by first fixing control. Sensor 302 is energized, and then, fixing device 36 is activated following an initial operation of determining the temperature of fixing device 36.

Referring to FIG. 4, in the first fixing control, in step S101, CPU 300 reads the temperature detected by sensor (i.e. non-contact thermistor) 302, whereby the temperature of the fixing roller in fixing device 36 is detected.

In step S103, CPU 300 determines whether the temperature read from sensor 302 is not lower than 60 degrees Celsius, so as to determine whether the temperature detected by sensor 302 is reliable. That is, if the temperature is sufficiently high, it can be determined that the power saving control has not been performed in image forming device 1 and that the temperature detected by sensor 302 is reliable. On the other hand, if the temperature is low, it can be determined that the power saving control has been performed and, thus, sensor 302 has not been able to detect the temperature stably.

If the temperature is low in step S103, in step S105, CPU 300 reads the temperature for about five seconds, so as to determine the temperature of the fixing roller measured by sensor 302. It generally takes about five seconds for the non-contact thermistor to determine the temperature of the fixing roller. It is thus possible to determine whether the temperature detected by sensor 302 is reliable.

If the temperature is high in step S103, in step S107, CPU 300 determines the temperature of the fixing roller.

Once the temperature of the fixing roller is determined, in step S109, CPU 300 turns on a heater in the fixing roller, whereby the temperature of the fixing roller increases.

In step S111, CPU 300 waits until the temperature of the fixing roller increases to 180 degrees Celsius or higher.

In step S113, CPU 300 turns off the heater. The first fixing control is thus completed.

As described above, image forming device 1 performs the first fixing control on fixing device 36 following the initial operation in steps S101 through S107. This allows the toner image transferred onto a sheet of paper to be fixed thereon.

Image forming device 1 is capable of operating in a first power saving mode and a second power saving mode, besides the print mode as described above. During the operation in the first power saving mode, CPU 300 turns off both remote 1 and remote 2. During the operation in the second power saving mode, CPU 300 turns on remote 1 and turns off remote 2. When image forming device 1 is not in use, controller 101 sets the operation mode to the first or second power saving mode to thereby save power consumed by image forming device 1. The power saving function will now be described.

Figure 5:
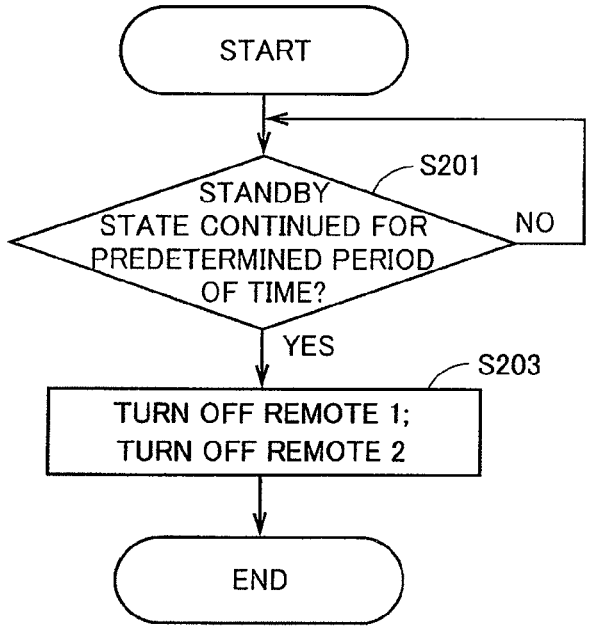
FIG. 5 is a flowchart illustrating an operation of the image forming device in the case where the operation mode is switched to a first power saving mode.

FIG. 5 is a flowchart illustrating an operation of image forming device 1 in the case where the operation mode is switched to the first power saving mode.

Referring to FIG. 5, in step S201, controller 101 determines whether a predetermined period of time has passed since image forming device 1 entered a standby state. The standby state refers to the state where no printing operation is performed, for example. In the present embodiment, the standby state continues as long as there is no print or copy instruction from a personal computer or the like and printing is not performed for example for the image data received by the facsimile function. It may be configured such that the standby state is terminated, not only when the printing operation is performed, but also when a scanning operation or the like is performed.

If it is determined in step S201 that the standby state has continued for the predetermined period of time, in step S203, controller 101 switches the operation mode to the first power saving mode. Specifically, in accordance with the control by controller 101, CPU 300 turns off both remote 1 and remote 2. Power is no longer supplied to print engine 301, sensor 302, and memory element 303, whereby the functions of print engine 301, sensor 302, and memory element 303 are all stopped. During the operation in the first power saving mode, print engine 301, sensor 302, and memory element 303 do not consume power, resulting in a decrease in the power consumed by image forming device 1.

Figure 6:
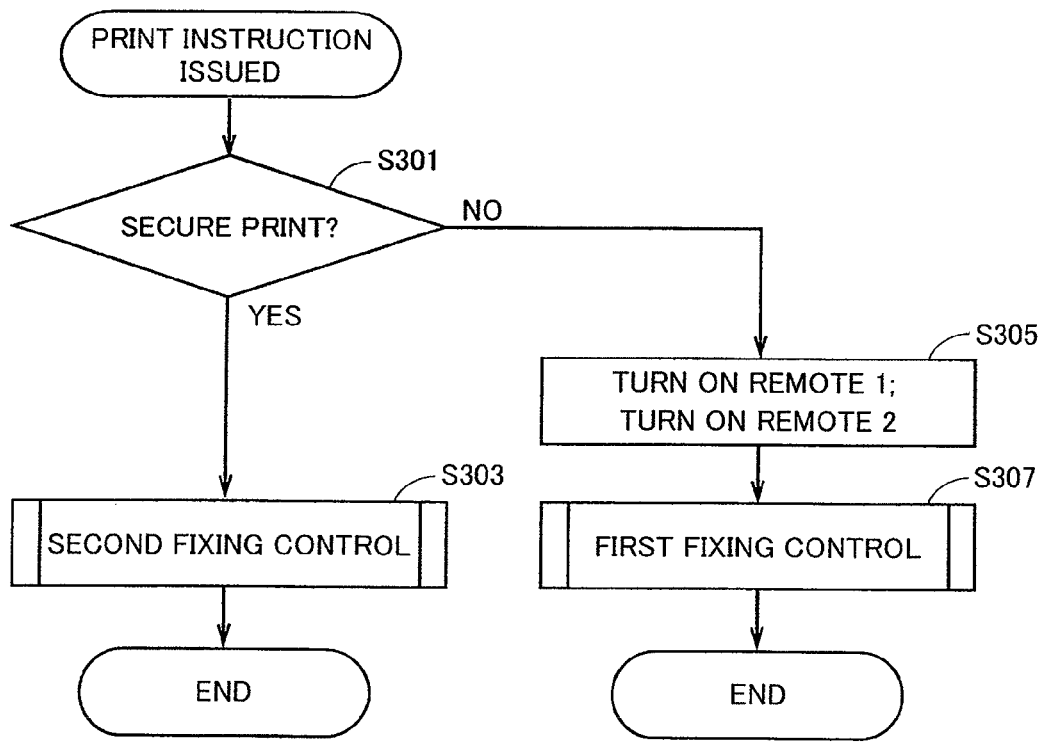
FIG. 6 is a flowchart illustrating an operation of the image forming device in the case where a print instruction is issued while the device is operating in the first power saving mode.

FIG. 6 is a flowchart illustrating an operation of image forming device 1 in the case where a print instruction is issued while the device is operating in the first power saving mode.

Referring to FIG. 6, when a print instruction is issued while the operation mode is set to the first power saving mode, the first power saving mode is released in the following manner.

Firstly, in step S301, controller 101 determines whether the print instruction is a secure print instruction.

If it is determined in step S301 that it is the secure print instruction, in step S303, controller 101 and CPU 300 perform second fixing control, which will be described later.

On the other hand, if it is determined in step S301 that it is not the secure print instruction, in step S305, controller 101 switches the operation mode from the first power saving mode to the print mode. CPU 300, under the control of controller 101, turns on both remote 1 and remote 2.

In step S307, CPU 300 performs the first fixing control. CPU 300 performs printing on a sheet of paper on the basis of the print instruction.

Figure 7:
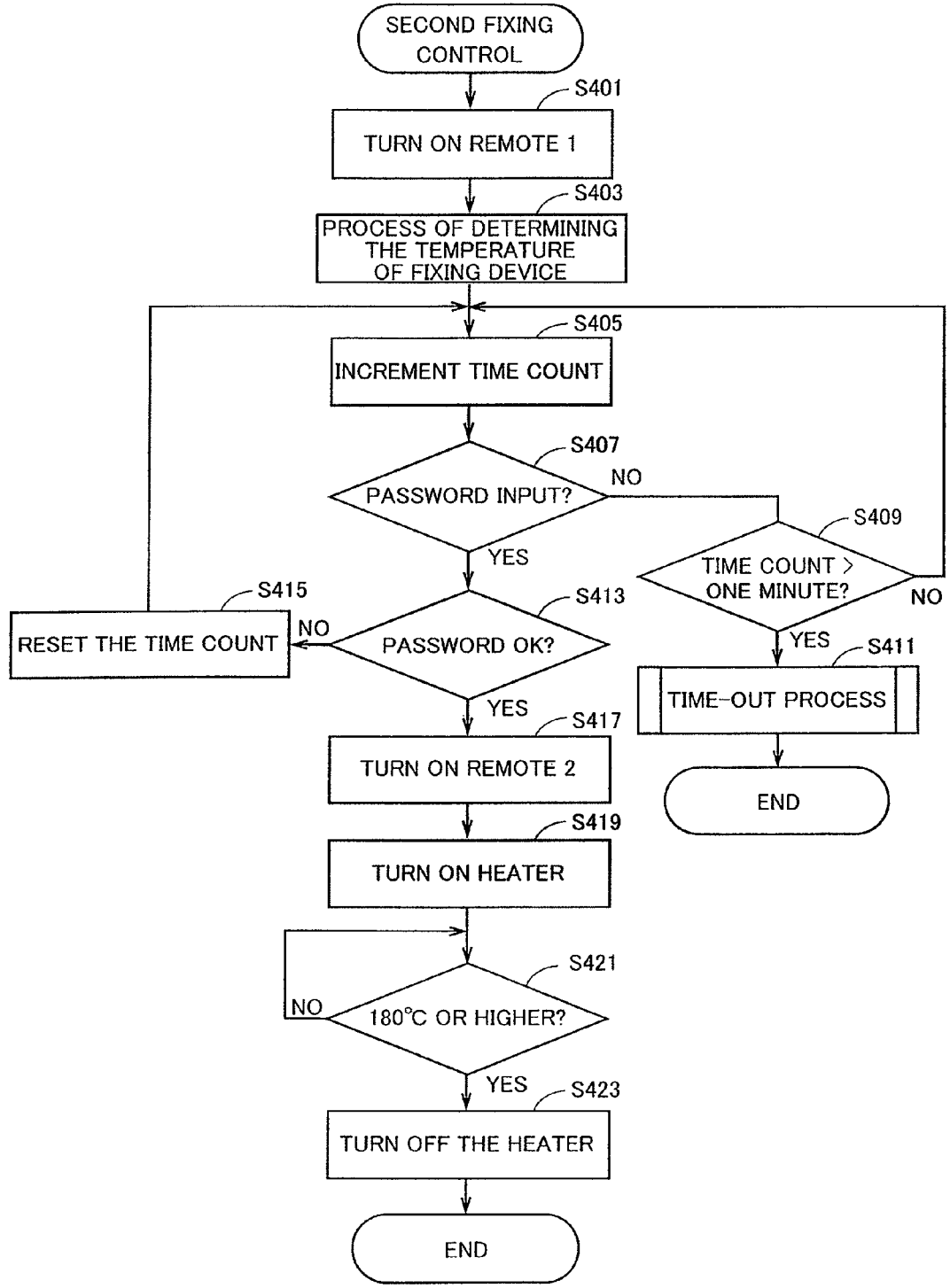
FIG. 7 is a flowchart illustrating a flow of second fixing control.

FIG. 7 is a flowchart illustrating a flow of the second fixing control.

As described above, the second fixing control is performed when a secure print instruction is received while the device is operating in the first power saving mode. At this time, controller 101 accepts an input of a password from operation panel 103 for identity authentication.

Referring to FIG. 7, in step S401, controller 101 switches the operation mode from the first power saving mode to the second power saving mode. CPU 300 turns on remote 1, while it maintains remote 2 off, so that sensor 302 is powered on and activated.

In step S403, CPU 300 performs a process of determining the temperature of fixing device 36. For example, CPU 300 reads the temperature of the fixing roller in fixing device 36 detected by sensor 302. Sensor 302 determines the temperature of fixing device 36 in about five seconds, as described above.

In step S405, CPU 300 starts counting the time. The time count is incremented over time.

In step S407, CPU 300 determines whether a password has been input.

If it is determined in step S407 that the password has not been input, in step S409, CPU 300 determines whether the time count has exceeded one minute. If the time count has not exceeded one minute, CPU 300 increments the time count. CPU 300 then determines whether a password has been input (S405, S407).

If it is determined in step S409 that the time count has exceeded one minute, in step S411, controller 101 and CPU 300 execute a time-out process, which will be described later.

If it is determined in step S407 that a password has been input, in step S413, controller 101 determines whether the identity can be authenticated with the input password.

If the identity authentication has failed in step S413, in step S415, CPU 300 resets the time count. Controller 101 and CPU 300 repeat the processes in steps S405 through S407.

If the identity authentication has succeeded in step S413, in step S417, controller 101 switches the operation mode from the second power saving mode to the print mode. CPU 300 turns on remote 2, while it maintains remote 1 on.

When the operation mode is switched to the print mode in step S417, CPU 300 performs printing onto a sheet of paper. The process of determining the temperature of fixing device 36 has already been performed in step S403. Thus, immediately after the identity authentication, CPU 300 performs the processes in steps S419 through S423, which are identical to steps S109 through S113 described above.

Figure 8:
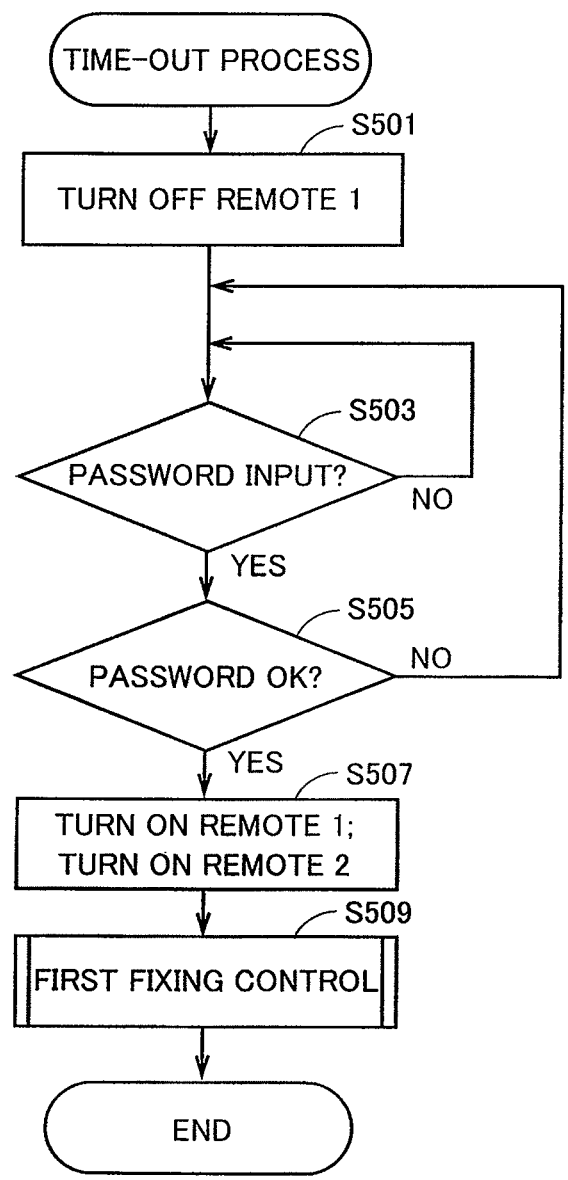
FIG. 8 is a flowchart illustrating a flow of a time-out process.

FIG. 8 is a flowchart illustrating a flow of the time-out process.

Referring to FIG. 8, when the operating state in the second power saving mode has continued for a predetermined period of time, in step S501, controller 101 switches the operation mode to the first power saving mode. CPU 300 turns off remote 1. As a result, the operation of sensor 302 is stopped, thereby suppressing power consumption by image forming device 1.

In step S503, controller 101 determines whether a password has been input.

If it is determined in step S503 that the password has been input, in step S505, controller 101 determines whether the identity can be authenticated with the input password. If it is not possible to authenticate the identity, controller 101 accepts an input of a password again.

If the identity authentication has succeeded in step S505, in step S507, controller 101 switches the operation mode from the first power saving mode to the print mode. CPU 300 turns on both remote 1 and remote 2.

In step S509, CPU 300 performs the first fixing control, for printing.

As described above, in the present embodiment, in the case where a user inputs a password at the time of secure print, CPU 300 turns on the heater of the fixing roller in fixing device 36 immediately after the identity authentication using the password has succeeded. This ensures that, following the identity authentication, the fixing temperature is increased quickly for printing. Even if a secure print instruction is issued, power is not supplied to print engine 301, which consumes a relatively large amount of power, until the identity authentication is performed so that it is actually determined to perform printing. This allows a printed matter to be output quickly, while ensuring the power saving effect.

In the case where the state of operating in the second power saving mode continues for a predetermined period of time without an input of a password, image forming device 1 switches the operation mode to the first power saving mode in which less power is consumed than in the second power saving mode, and waits until the identity authentication is performed. This further reduces the power consumed by image forming device 1.

Second Embodiment

The configuration of the image forming device according to a second embodiment is basically the same as that of the first embodiment, and thus, description thereof will not be repeated. The second embodiment differs from the first embodiment in that image forming device 1 has an image forming unit 600 that is different in circuit configuration from that of the first embodiment. When the device is operating in the second power saving mode, power is supplied to memory element 303.

Figure 9:
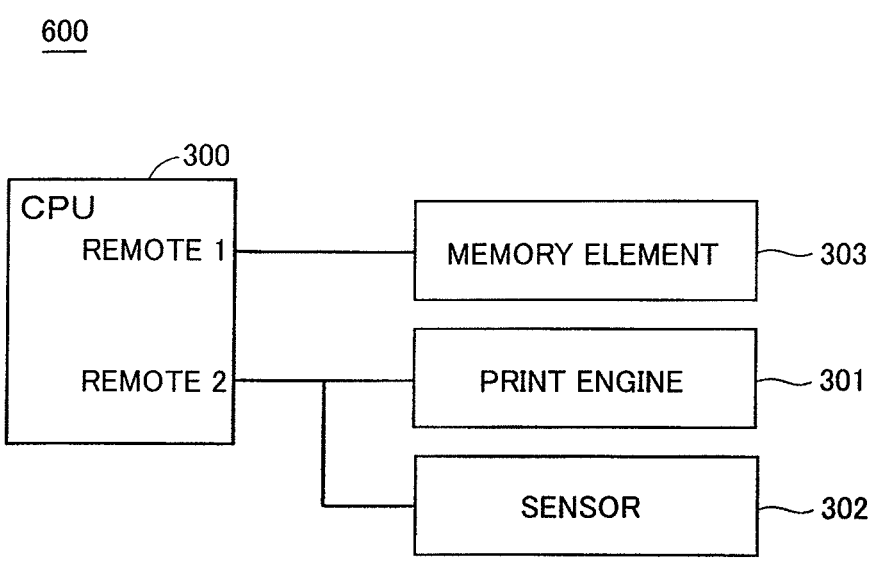
FIG. 9 is a block diagram showing a configuration of the image forming unit according to a second embodiment.

FIG. 9 is a block diagram showing the configuration of image forming unit 600 according to the second embodiment.

Referring to FIG. 9, remote 1 in CPU 300 is connected with a circuit (an example of a first circuit) having memory element 303, while remote 2 is connected with a circuit (an example of a second circuit) having print engine 301 and sensor 302. Memory element 303 is powered on and activated when remote 1 is turned on by the power supply control by CPU 300. Print engine 301 and sensor 302 are powered on and activated when remote 2 is turned on by the power supply control by CPU 300.

Figure 10:
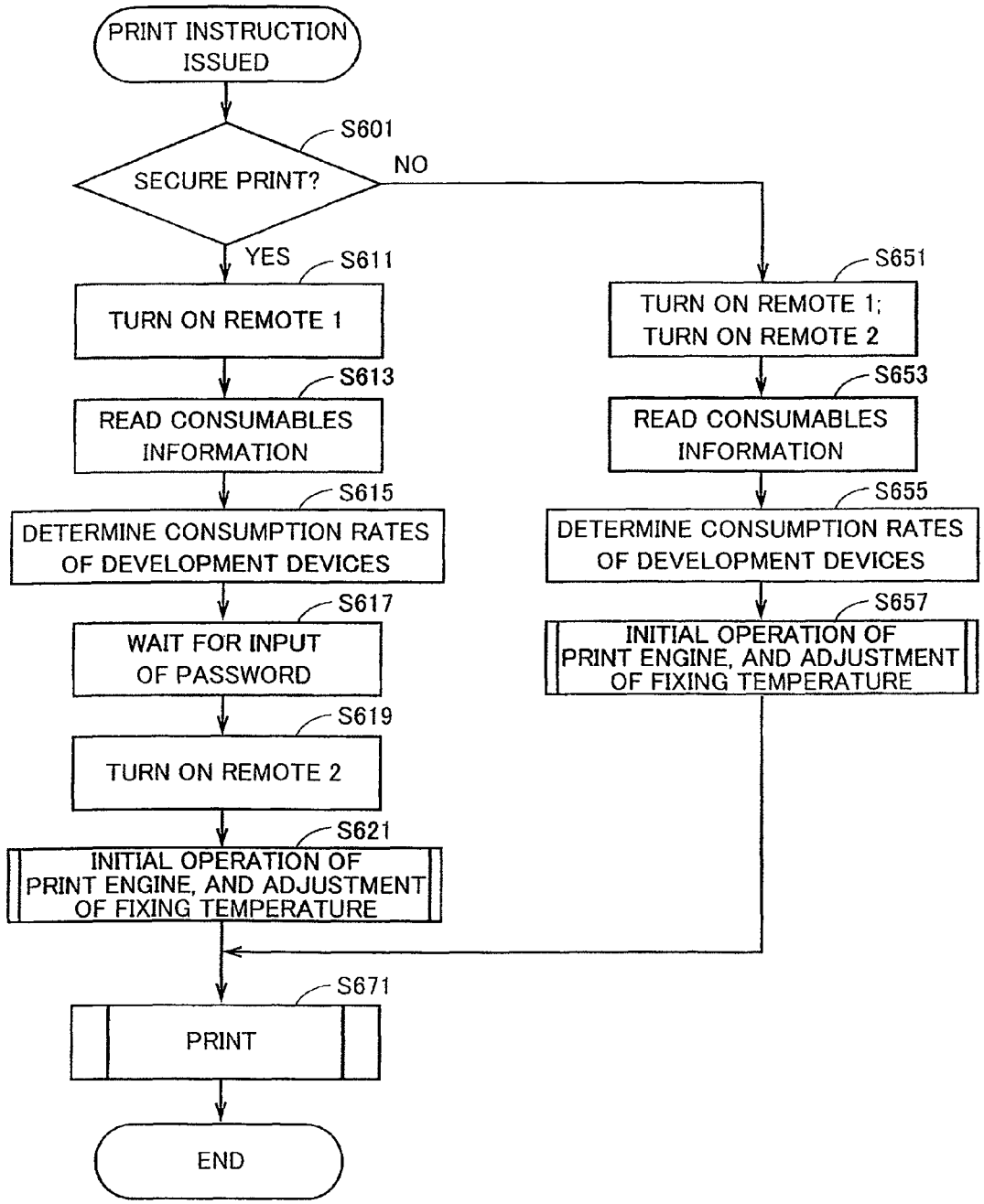
FIG. 10 is a flowchart illustrating an operation of the image forming device in the case where a print instruction is issued while the device is operating in the first power saving mode in the second embodiment.

FIG. 10 is a flowchart illustrating an operation of image forming device 1 in the case where a print instruction is issued while the device is operating in the first power saving mode according to the second embodiment.

In the second embodiment, CPU 300 acquires, prior to printing, consumables information (data about development devices 20Y, 20M, 20C, and 20K) from memory element 303 so as to perform an initial operation of confirming the states of consumption of development devices 20Y, 20M, 20C, and 20K.

Referring to FIG. 10, in step S601, controller 101 determines whether the print instruction is a prescribed secure print instruction.

If it is determined in step S601 that it is the secure print instruction, in step S611, controller 101 switches the operation mode to the second power saving mode. CPU 300 turns on remote 1, whereby memory element 303 is activated.

In step S613, CPU 300 reads (or, acquires) the consumables information from memory element 303.

In step S615, CPU 300, on the basis of the read consumables information, calculates and determines the consumption rate in each of development devices 20Y, 20M, 20C, and 20K.

In step S617, CPU 300 waits for an input of a password.

In step S619, controller 101 switches the operation mode from the second power saving mode to the print mode after the identity authentication is performed. CPU 300 turns on remote 2, whereby print engine 301 and sensor 302 are activated.

In step S621, CPU 300 performs an initial operation for print engine 301. CPU 300 also performs an initial operation for fixing device 36 to thereby adjust the temperature.

On the other hand, if it is determined in step S601 that the print instruction is not the secure print instruction, in step S651, controller 101 switches the operation mode to the print mode. CPU 300 turns on both remote 1 and remote 2, whereby print engine 301, sensor 302, and memory element 303 are activated.

In steps S653 and S655, CPU 300 operates similarly as in steps S613 and S615. Specifically, CPU 300 reads the consumables information to determine the consumption rates of development devices 20Y, 20M, 20C, and 20K.

In step S657, CPU 300 performs the initial operations for print engine 301 and fixing device 36, as in step S621.

When the initial operations for print engine 301 and fixing device 36 are completed in step S621 or S657, in step S671, CPU 300 performs printing.

It may be configured such that, if a password is not entered within a predetermined period of time in step S617, controller 101 and CPU 300 execute the time-out process, similarly as in the first embodiment.

As described above, according to the second embodiment, when a user inputs a password and the identity of the user is authenticated at the time of secure print, the initial operations for print engine 301 and fixing device 36 are started immediately. This can save the time required for determining the consumption rates of development devices 20Y, 20M, 20C, and 20K after the identity authentication, so that the printing can be performed quickly. After a secure print instruction is issued, power is not supplied to print engine 301, which consumes a relatively large amount of power, until the identity authentication is performed and it is determined that the printing is actually carried out. This allows a printed matter to be output quickly, while ensuring the power saving effect.

Third Embodiment

The configuration of the image forming device according to a third embodiment is basically the same as that of the first embodiment, and thus, description thereof will not be repeated. The third embodiment differs from the first embodiment in the following points. In the first power saving mode, CPU 300 is not activated. CPU 300 is initialized in the case where the operation mode is switched from the first power saving mode to either the second power saving mode or the print mode so that image forming unit 100 is activated.

In the third embodiment, when the device is operating in the first power saving mode, controller 101 stops power supply to image forming unit 100 and scanner control unit 104. This reduces the power consumed by image forming device 1.

Figure 11:
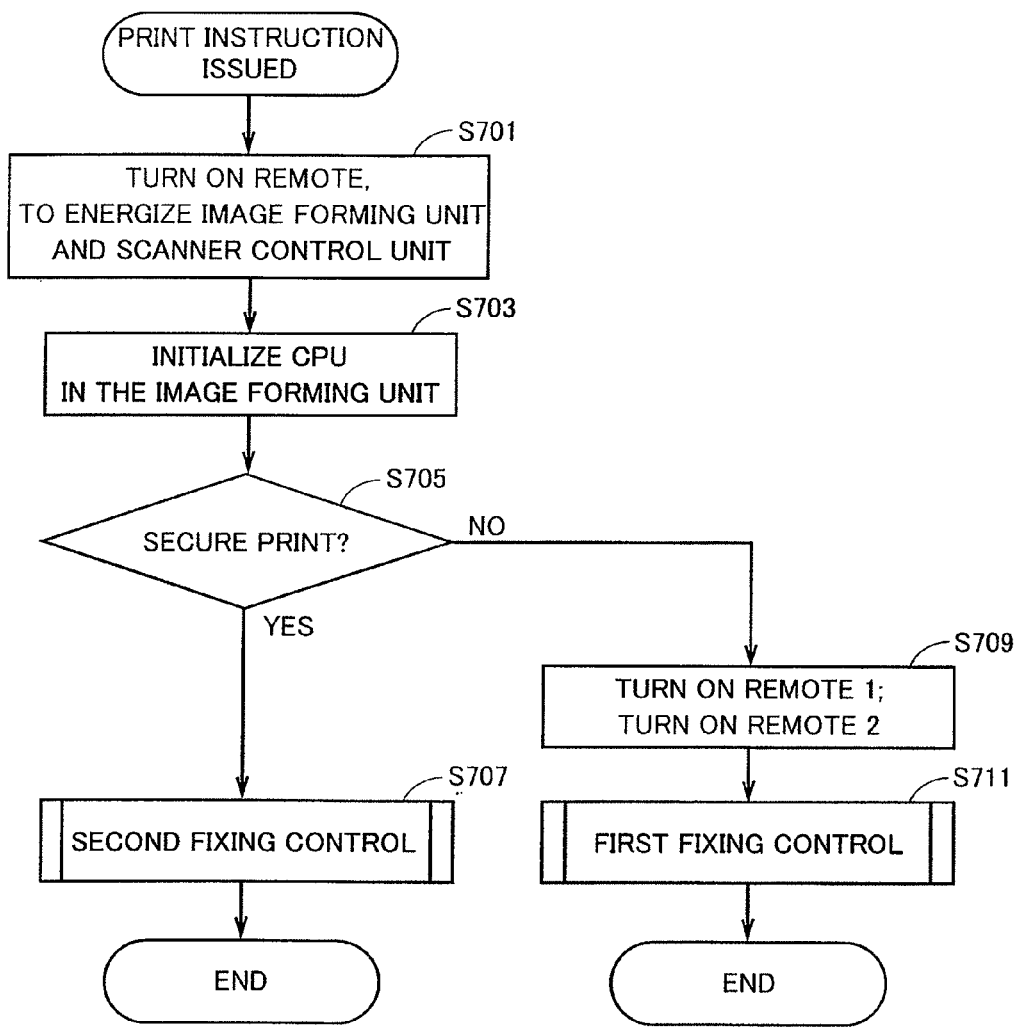
FIG. 11 is a flowchart illustrating an operation of the image forming device in the case where a print instruction is issued while the device is operating in the first power saving mode according to a third embodiment.

FIG. 11 is a flowchart illustrating an operation of image forming device 1 in the case where a print instruction is issued while the device is operating in the first power saving mode according to the third embodiment.

Referring to FIG. 11, when a print instruction is issued, in step S701, controller 101 switches the operation mode from the first power saving mode to either the second power saving mode or the print mode. Specifically, if a secure print instruction is issued, controller 101 switches the operation mode to the second power saving mode. If a print instruction other than the secure print instruction is issued, controller 101 switches the operation mode to the print mode. Controller 101 turns on a remote (not shown) of controller 101, to energize image forming unit 100 and scanner control unit 104.

In step S703, controller 101 initializes CPU 300, for stabilization of the subsequent operations of CPU 300.

The operations in steps S705 through S711 are similar to those in steps S301 through S307 in the first embodiment. That is, if the print instruction is the secure print instruction, controller 101 and CPU 300 perform the second fixing control to perform printing after the identity authentication. If the print instruction is not the secure print instruction, controller 101 and CPU 300 perform the first fixing control to perform printing.

As described above, according to the third embodiment, CPU 300 is initialized so as to stabilize the operations of CPU 300. This ensures reliable printing.

Fourth Embodiment

The configuration of the image forming device according to a fourth embodiment is basically the same as that of the second embodiment, and thus, description thereof will not be repeated. The fourth embodiment differs from the second embodiment in that an image stabilization process is performed as required.

Firstly, the image stabilization process will be described. In the image stabilization process, for example, controller 101 and CPU 300 perform the following processes: detection of current leakage upon development, adjustment of the maximum amount of toner deposited upon development, adjustment of the amount of laser light, gamma correction, and the like.

The detection of current leakage upon development is performed in the following manner. Firstly, a developing AC voltage is gradually increased, to detect current leakage using a circuit for detecting leakage of current. Then, the developing AC voltage is lowered by 100 volts, for example, from the voltage at which leakage was detected. In the case where an image is formed by electrophotography, if the developing AC voltage is too high, leakage of current will take place, resulting in defective image quality. On the other hand, if the developing AC voltage is too low, the density may become uneven. Adjusting the developing AC voltage to a proper level through the detection of current leakage upon development ensures an output of a proper image.

In the adjustment of the maximum amount of toner deposited upon development, the developing bias is determined so that an appropriate amount of toner is deposited when creating a solid image. Specifically, a plurality of solid image patches are created with different developing biases, and an image density sensor is used to read the respective patches to thereby determine the developing bias that allows the toner of an appropriate amount to be deposited.

In the adjustment of the amount of laser light, the amount of laser light is determined so that a thin line can be properly reproduced and printed. Specifically, with the developing output that has been determined through the detection of current leakage upon development and the adjustment of the maximum amount of toner deposited upon development, a plurality of shaded patches are created using different amounts of laser light. The image density sensor is used to read the respective patches to evaluate the read results, so that the appropriate amount of laser light is determined.

The gamma correction is performed in the following manner. Firstly, a plurality of gray scale patterns are created using the developing output and the laser light amount that have been determined through the detection of current leakage upon development, the adjustment of the maximum amount of toner deposited upon development, and the adjustment of the amount of laser light. Then, the image density sensor is used to read the patches of the gray scale patterns. The gamma correction value is adjusted such that the gray scale pattern can be created properly.

The image stabilization process is carried out in the case where it is determined that the process is necessary as a result of the determination of necessity of image stabilization. Whether the image stabilization process is necessary or not is determined for example on the basis of the following conditions.

Firstly, all the image stabilization processes described above are carried out for example at the time of replacement of a member such as development device 20Y, 20M, 20C, or 20K. All the image stabilization processes are also carried out every time 1000 pages are printed, because the toner, developing roller, photoreceptors, or intermediate transfer belt 31 may be consumed or wear out, possibly hindering creation of a proper image. Further, all the image stabilization processes described above are carried out in the case where there is a change in the environment surrounding image forming device 1, including the ambient temperature and humidity, because the environmental change may lead to a change in characteristics of the toner, developing roller, photoreceptors, or intermediate transfer belt 31, in which case an image may not be created properly. Still further, every time 200 pages are printed, the adjustment of the maximum amount of toner deposited upon development, the adjustment of the amount of laser light, and the gamma correction are carried out, excluding the detection of current leakage upon development, because an image may not be created properly. Of the image stabilization processes, the detection of current leakage upon development is carried out in the case where a toner cartridge or a photoreceptor is replaced, thereby causing a change in the distance between the developing roller and the photoreceptor, or in the case where the environment has changed significantly.

The time required for the image stabilization process will now be described by way of example. The detection of current leakage upon development requires about 15 seconds at maximum, although it depends on the leaking voltage. The adjustment of the maximum amount of toner deposited upon development requires about six seconds. The adjustment of the amount of laser light requires about three seconds. The gamma correction requires about six seconds. They are the time required for each color. In the case where image forming device 1 performs the overall image stabilization process for four colors, it will take four times longer than the time required for each color. That is, it will take about 30 seconds to perform all the image stabilization processes for one color, and therefore, it will take about 120 seconds to perform those image stabilization processes for four colors. In the case where the image stabilization processes except the detection of current leakage upon development are carried out every time 200 pages are printed, it will take about 15 seconds for one color and, hence, about 60 seconds for four colors.

In the fourth embodiment, controller 101 and CPU 300 perform the image stabilization process, as necessary, when the operation mode is switched to the second power saving mode or the print mode while the device is operating in the first power saving mode. The image stabilization process can be carried out when remote 1 in CPU 300 is on.

Figure 12:
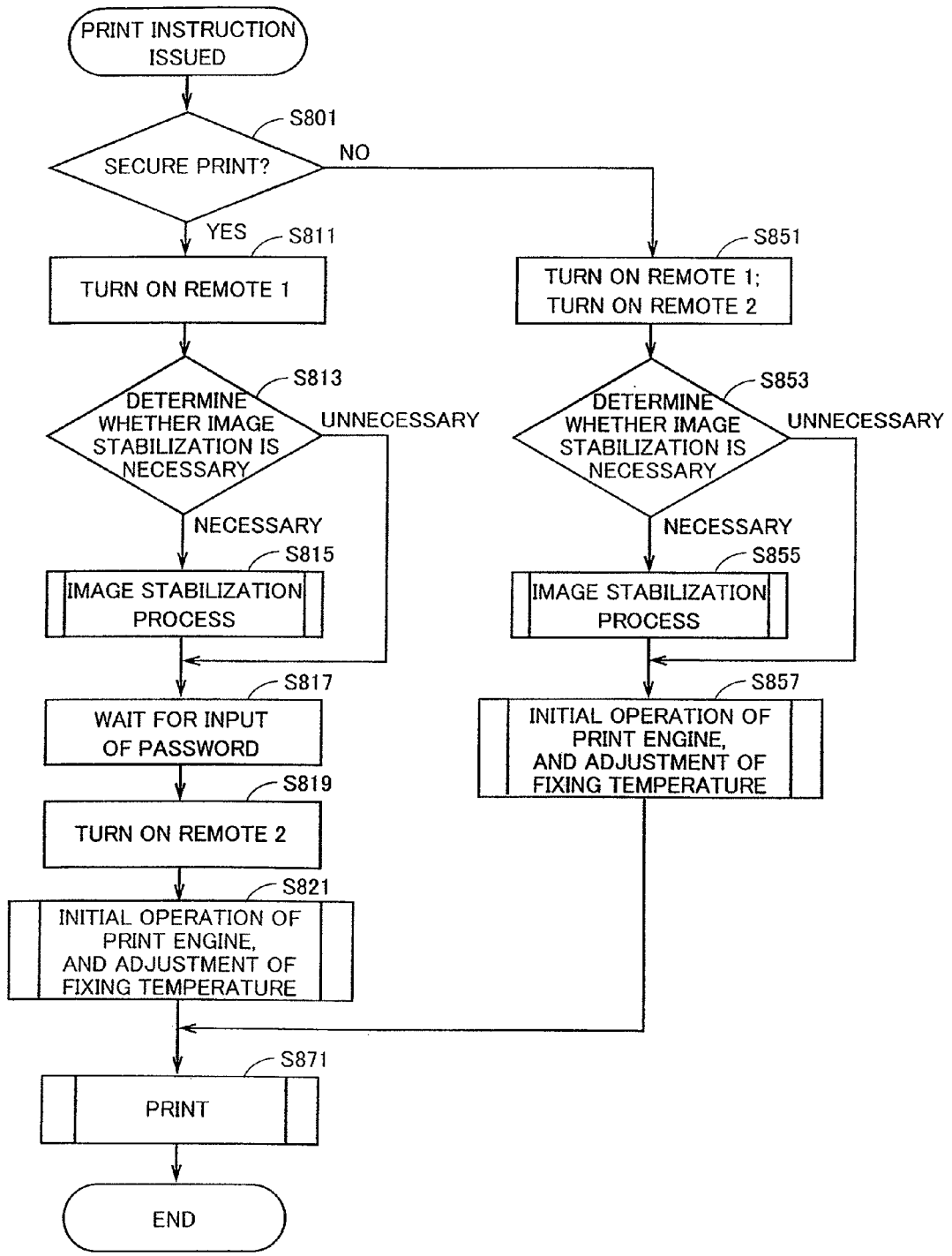
FIG. 12 is a flowchart illustrating an operation of the image forming device in the case where a print instruction is issued while the device is operating in the first power saving mode according to a fourth embodiment.

FIG. 12 is a flowchart illustrating an operation of image forming device 1 in the case where a print instruction is issued while the device is operating in the first power saving mode according to the fourth embodiment.

Referring to FIG. 12, when a print instruction is issued, in step S801, controller 101 determines whether the print instruction is a prescribed secure print instruction.

If it is determined in step S801 that it is the secure print instruction, in step S811, controller 101 switches the operation mode to the second power saving mode. CPU 300 turns on remote 1.

In step S813, controller 101 and CPU 300 perform the process of determining the necessity of image stabilization.

If it is determined in step S813 that the image stabilization process is necessary, in step S815, controller 101 and CPU 300 perform the image stabilization process.

When the image stabilization process has been performed in step S815, or if it is determined in step S813 that the image stabilization process is unnecessary, in steps S817 through S821, controller 101 and CPU 300 perform the processes similar to those in steps S617 through S621 in the second embodiment described above. That is, when the identity authentication is successful, controller 101 and CPU 300 switch the operation mode to the print mode, and perform the initial operations for print engine 301 and fixing device 36.

On the other hand, if it is determined in step S801 that the print instruction is not the secure print instruction, in step S851, controller 101 switches the operation mode to the print mode. CPU 300 turns on both remote 1 and remote 2, so that print engine 301, sensor 302, and memory element 303 are all activated.

In steps S853 and S855, as in steps S813 and S815, controller 101 and CPU 300 perform the process of determining the necessity of image stabilization and, if necessary, perform the image stabilization process.

In step S857, controller 101 and CPU 300 perform the initial operations for print engine 301 and fixing device 36, as in step S821.

When the initial operations for print engine 301 and fixing device 36 are completed in step S821 or S857, in step S871, CPU 300 performs printing.

It may be configured such that, if a password is not input within a predetermined period of time in step S817, controller 101 and CPU 300 perform the time-out process, similarly as in the first embodiment. In conjunction with the process of determining the necessity of image stabilization, the process of determining the consumption rates of development devices 20Y, 20M, 20C, and 20K may be performed, similarly as in the second embodiment. The determination of the consumption rates may be performed together with the initial operations for print engine 301 and fixing device 36 in step S821 or S857, although the determination of the consumption rates does not necessarily have to be performed.

As described above, according to the fourth embodiment, at the time of secure print, the time-consuming image stabilization process is carried out, if necessary, prior to the identity authentication. This allows printing to be done quickly after the identity authentication, without the time loss due to the image stabilization process. Power is not supplied to print engine 301 or the like until the identity authentication is performed, except the case where it is necessary for the image stabilization process. This can reduce the amount of power consumed by image forming device 1.

The image stabilization process does not necessarily have to be performed on an as-needed basis. It may be configured such that one or more of the image stabilization processes are carried out whenever a secure print instruction is issued.

In the fourth embodiment, it may be configured such that an input of a password may be accepted and identity authentication may be performed prior to, or in the middle of, the image stabilization process. In this case, controller 101 may be configured not to switch the operation mode to the print mode, even if the identity authentication is successful, until the image stabilization is completed.

In the fourth embodiment, in the case where an input of a password has been accepted during the image stabilization process and the identity authentication has succeeded, controller 101 may be configured to cancel the identity authentication a predetermined period of time after the identity authentication was completed.

FIG. 13 is a flowchart illustrating an operation of image forming device 1 in the case where the identity authentication is performed during the image stabilization process.

Referring to FIG. 13, in the case where a secure print instruction is issued while the device is operating in the first power saving mode, in step S901, controller 101 switches the operation mode to the second power saving mode. CPU 300 turns on remote 1.

In step S903, controller 101 performs the process of determining the necessity of image stabilization.

If it is determined in step S903 that the image stabilization process is unnecessary, in step S905, CPU 300 waits for an input of a password.

On the other hand, if it is determined in step S903 that the image stabilization process is necessary, in step S907, controller 101 and CPU 300 perform the image stabilization process.

In the case where the image stabilization process is performed in step S907, in step S909, controller 101 determines whether identity authentication has been performed before the image stabilization process was finished. If the identity authentication has not been performed, the process proceeds to step S905.

If it is determined in step S909 that the identity authentication has been performed, in step S911, controller 101 determines whether a predetermined period of time has passed after the identity authentication. The predetermined period of time may be set to 15 seconds, for example. If the predetermined period of time has not passed, the process proceeds to step S915.

If it is determined in step S911 that the predetermined period of time has passed, in step S913, controller 101 cancels the identity authentication that had been performed before the image stabilization process was finished. After the identity authentication is cancelled, the process proceeds to step S905.

If the identity authentication is performed in step S905, or if it is determined in step S911 that the predetermined period of time has not passed after the identity authentication was performed during the image stabilization process, in step S915, controller 101 switches the operation mode to the print mode. CPU 300 turns on remote 2.

In step S917, CPU 300 performs the initial operations for print engine 301 and fixing device 36.

In step S919, CPU 300 performs printing.

As described above, in the case where the identity authentication is performed during the image stabilization process, controller 101 cancels the identity authentication after a lapse of a predetermined period of time, which can improve the security level of the secure print. More specifically, in the case where a printed matter is output after a certain amount of time has passed from the identity authentication, the user who has performed the identity authentication may have already returned to his/her desk or seat distant from image forming device 1. In such a case, another person may see the printed matter, possibly causing leakage of information. When the identity authentication is cancelled after a lapse of a predetermined period of time and authentication is required again for printing, as in the present embodiment, the above problem can be solved so that the security level improves.

Effects of the Embodiments

In the image forming device configured as described above, in the case where a secure print instruction is received in the first power saving mode, the operation mode is switched to the second power saving mode in which a part of the image forming unit is activated to prepare for printing. That is, not all the components of the image forming unit are activated before the identity authentication, so that the power consumption can be reduced. After the identity authentication, the device quickly becomes ready to print, thereby reducing the time, called the "first print time", that is required until a first printed matter is output after the identity authentication. This can further enhance the convenience of the image forming device.

[Others]

The image forming device may be configured to perform the operations as a combination of the processes performed by the above embodiments. For example, the first and second embodiments may be combined so that the process of determining the temperature of the fixing device by the sensor and the process of determining the consumption rates may both be carried out in the second power saving mode. This can further reduce the first print time.

The image forming device may be any of a black-and-white or color copier, printer, facsimile machine, or a multi-function peripheral (MFP) as a combination thereof. The image forming device is not restricted to the one which forms images by electrophotography, but may be the one which forms images by a so-called inkjet system. For example, the inkjet image forming device may be configured to perform a necessary cleaning operation when the operation mode is switched to the second power saving mode. In this case, printing can be started immediately after the operation mode is switched to the print mode afterwards.

The processes according to the above embodiments may be performed by software or by using a hardware circuit.

A program for executing the processes according to the above embodiments may be provided as well. The program may be recorded on a recording medium, such as a CD-ROM, flexible disk, hard disk, ROM, RAM, memory card, or the like, so as to be provided to the user. The program may also be downloaded to the device via a communication line such as the Internet. The processes described in conjunction with the flowcharts above are executed by a CPU and the like in accordance with the program.

According to the present invention, the image forming device, when receiving a secure print instruction while operating in the first power saving mode, switches the operation mode to the second power saving mode. Thereafter, when the identity of the user is authenticated, the image forming device switches the operation mode to the print mode. As a result, it is possible to provide the image forming device which is capable of restricting the power consumption and also capable of reducing the time required for printing out after the identity authentication.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. An image forming device, comprising:
   a first circuit;
   a second circuit, the second circuit being at least partially different from said first circuit;
   a first power supply control unit configured to perform power supply control of said first circuit; and
   a second power supply control unit configured to perform power supply control of said second circuit;
   said first circuit having an acquiring unit configured to acquire a state of the image forming device,
   said image forming device being capable of operating in
      a print mode in which said first and second circuits are activated in accordance with the power supply control by said first and second power supply control units,
      a first power saving mode in which said first power supply control unit performs no power supply control so that said first circuit is not activated, and in which said second power supply control unit performs no power supply control so that said second circuit is not activated, and
      a second power saving mode in which said second power supply control unit performs no power supply control so that said second circuit is not activated, and in which said first power supply control unit performs the power supply control so that said first circuit is activated to perform the acquisition by said acquiring unit,
   said image forming device further comprising:
      a first switching unit configured to switch an operation mode from said first power saving mode to said second power saving mode in the case where an instruction to perform secure print is received while the device is operating in said first power saving mode; and
      a second switching unit configured to switch the operation mode from said second power saving mode to said print mode in the case where the identity of a user is authenticated while the device is operating in said second power saving mode.

2. The image forming device according to claim 1, wherein in said secure print, after a print instruction is accepted, printing based on said print instruction is carried out only after the identity of the user is authenticated.

3. The image forming device according to claim 1, wherein said acquiring unit includes a sensor for detecting the state of said image forming device.

4. The image forming device according to claim 1, wherein said acquiring unit reads consumables information about consumables used for image formation from a memory element for storing said consumables information.

5. The image forming device according to claim 1, further comprising a third switching unit configured to switch the operation mode from said second power saving mode to said first power saving mode in the case where the state of operating in said second power saving mode has continued for a predetermined period of time.

6. The image forming device according to claim 5, further comprising a fourth switching unit configured to switch the operation mode from said first power saving mode to said print mode in the case where identity authentication is performed while the device is operating in said first power saving mode after said third switching unit has switched the operation mode to said first power saving mode.

7. The image forming device according to claim 1, further comprising:
- an image formation control unit configured to control an operation of a print engine, the print engine performing image formation; and
    - an initialization unit configured to perform initialization of said image formation control unit, wherein
    - said image formation control unit is configured not to be activated in said first power saving mode but to be activated in said second power saving mode and said print mode, and
    - said initialization unit performs said initialization in the case where the operation mode is switched from said first power saving mode to either said second power saving mode or said print mode so that said image formation control unit is activated.

8. The image forming device according to claim 1, further comprising an image stabilization unit configured to perform an image stabilization process consistently, or as required, in the case where the operation mode is switched to said second power saving mode by said first switching unit.

9. The image forming device according to claim 8, further comprising an authentication cancelling unit configured, in the case where the identity authentication is performed during the image stabilization process by said image stabilization unit, to cancel said identity authentication a predetermined period of time after the identity authentication was completed, wherein
- said second switching unit is configured not to switch the operation mode to said print mode during said image stabilization process.

10. A method for controlling an image forming device, the image forming device including
- a first circuit,
- a second circuit, the second circuit being at least partially different from said first circuit,
- a first power supply control unit configured to perform power supply control of said first circuit, and
- a second power supply control unit configured to perform power supply control of said second circuit,
- said first circuit having an acquiring unit configured to acquire a state of the image forming device,
- said image forming device being capable of operating in
    - a print mode in which said first and second circuits are activated in accordance with the power supply control by said first and second power supply control units,
    - a first power saving mode in which said first power supply control unit performs no power supply control so that said first circuit is not activated, and in which said second power supply control unit performs no power supply control so that said second circuit is not activated, and
    - a second power saving mode in which said second power supply control unit performs no power supply control so that said second circuit is not activated, and in which said first power supply control unit performs the power supply control so that said first circuit is activated to perform the acquisition by said acquiring unit, the method comprising the steps of:
- in the case where an instruction to perform secure print is received while the device is operating in said first power saving mode, switching the operation mode to said second power saving mode; and
- in the case where the identity of a user is authenticated while the device is operating in said second power saving mode, switching the operation mode to said print mode.

11. A non-transitory computer readable medium for controlling an image forming device, the computer readable medium having a program causing a computer to execute processing,
the image forming device including
- a first circuit,
- a second circuit, the second circuit being at least partially different from said first circuit,
- a first power supply control unit configured to perform power supply control of said first circuit, and
- a second power supply control unit configured to perform power supply control of said second circuit,
- said first circuit having an acquiring unit configured to acquire a state of the image forming device,
- said image forming device being capable of operating in
    - a print mode in which said first and second circuits are activated in accordance with the power supply control by said first and second power supply control units,
    - a first power saving mode in which said first power supply control unit performs no power supply control so that said first circuit is not activated, and in which said second power supply control unit performs no power supply control so that said second circuit is not activated, and
    - a second power saving mode in which said second power supply control unit performs no power supply control so that said second circuit is not activated, and in which said first power supply control unit performs the power supply control so that said first circuit is activated to perform the acquisition by said acquiring unit, the program causing a computer to execute processing comprising the steps of:
- in the case where an instruction to perform secure print is received while the device is operating in said first power saving mode, switching the operation mode to said second power saving mode; and
- in the case where the identity of a user is authenticated while the device is operating in said second power saving mode, switching the operation mode to said print mode.

* * * * *